United States Patent [19]

Kalogerson

[11] 4,174,766

[45] Nov. 20, 1979

[54] SPEED SHIFT INDICATOR

[75] Inventor: Thomas A. Kalogerson, Minneapolis, Minn.

[73] Assignee: Kaltron Company, Inc., Minneapolis, Minn.

[21] Appl. No.: 928,514

[22] Filed: Jul. 27, 1978

[51] Int. Cl.² ............................................. B60K 23/00
[52] U.S. Cl. .............................. 340/52 D; 307/10 LS;
324/169; 74/339; 180/313
[58] Field of Search ............... 180/106, 105 R, 105 E;
340/52 D, 62; 307/10 LS; 324/161, 169

[56] References Cited

U.S. PATENT DOCUMENTS

| | | | |
|---|---|---|---|
| 3,420,328 | 1/1969 | Johnson et al. | 180/106 |
| 3,603,878 | 9/1971 | Himmelstein | 324/169 |
| 3,719,888 | 3/1973 | Sampey | 324/161 |
| 3,909,619 | 9/1975 | Kniesly et al. | 307/10 LS |

Primary Examiner—Robert R. Song
Attorney, Agent, or Firm—Kinney, Lange, Westman and Fairbairn

[57] ABSTRACT

A speed shift indicating device is mounted in the driver compartment of a motor vehicle and is connected to the ignition system by a single wire which extends from the driver compartment through the firewall and into the engine compartment. The single wire derives from the ignition system an electrical input signal having a repetition rate indicative of engine revolutions per minute (RPM). The speed shift indicating device has an electrical circuit connected to the single wire for receiving an input electrical signal which has a repetition rate indicative of engine RPM. Trigger pulses are produced in response to the input electrical signal and are supplied to a timer. The output of the timer switches to a first state in response to each trigger pulse and remains in the first state only for a first time period unless another trigger pulse is received before the end of the first time period. The first time period is adjustable by the driver. An annunciator is energized to indicate that the engine has attained a speed at which shifting of the transmission should be done only if the output of the timer remains in the first state for at least a second time period which is greater than the first time period.

11 Claims, 3 Drawing Figures

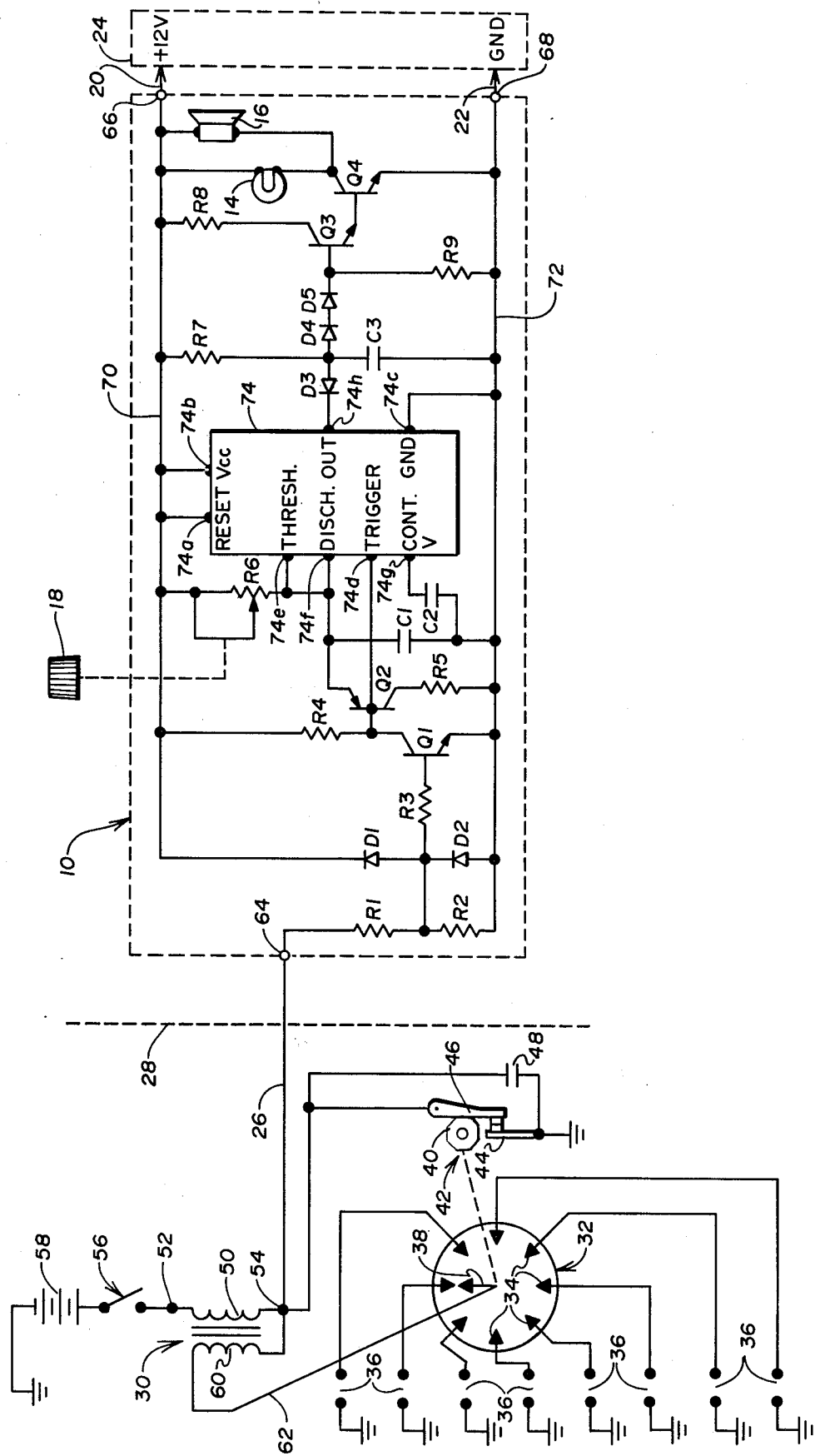

SPEED SHIFT INDICATOR

BACKGROUND OF THE INVENTION

The present invention relates to speed shift indicating devices for motor vehicles driven by an internal combustion engine and which have a manually controlled transmission. The speed shift indicating device provides an indication to the driver of the optimum point at which to shift the manual transmission.

In motor vehicles having a manual shift transmission, it is highly desirable to provide some device which indicates the optimum point at which to shift. By shifting when the engine speed reaches a predetermined value, maximum acceleration may be obtained, and damage caused by excessive engine speed can be avoided.

Many drivers of high performance vehicles such as sports or race cars purchase relatively expensive tachometers to assist them in shifting the transmission at the optimum point. These tachometers often have needles or movable indicators which must be watched to determine when the desired shift point is reached. These devices, however, tend to distract the driver's attention from the road. Furthermore, they are often expensive and require an appreciable amount of work to install them in the vehicle.

In the past, devices have been proposed which would indicate to the driver by means of an indicator light or buzzer when he should shift gears. Examples of such devices are described in U.S. Pat. Nos. 3,420,328 by Johnson et al; 3,603,878 by Himmelstein; 3,719,888 by Sampey; and 3,909,619 by Kniesley et al. One problem with the prior art devices has been that they have either required a relatively large number of components, required elaborate modification of the automobile for installation, or are intended for original equipment in the automobile. There remains a definite need for an arcuate, low-cost, compact, simple-to-install speed shift indicator which is adaptable to a wide variety of vehicles and both electro-mechanical and electronic ignition systems.

SUMMARY OF THE INVENTION

The speed shift indicating device of the present invention is located within the driver compartment and provides the driver a positive indication of when engine speed reaches a predetermined level. The speed shift indicating device is compact and may be installed in a variety of locations within the driver's compartment. A single electrical wire extends from the driver compartment through the firewall and into the engine compartment, where it is connected to the ignition system to derive an input electrical signal having a repetition rate indicative of engine RPM. The speed shift indicating device includes an electrical circuit which is connected to the single wire and receives the input electrical signal.

The speed shift indicating device preferably includes trigger means which provides trigger pulses in response to the input electrical signal. The trigger pulses are supplied to timer means, whose output switches to a first state in response to a trigger pulse and remains in that first state only for a first time period unless another trigger pulse is received before the end of the first time period. Adjusting means permits the driver to adjust the first time period so as to select a predetermined engine speed, and therefore a predetermined shift point. Annunciator control means controls a light, a buzzer or horn, or other type of annunciator means to indicate that the desired shift point has been attained. The annunciator control means energizes the annunciator means only if the output of the timer means remains in the first state for at least a second time period which is greater than the first time period. In other words, the annunciator means is energized only when the time period between successive trigger pulses becomes short enough that another trigger pulse is received before the end of the first time period.

BRIEF DESCRIPTION OF THE DRAWINGS

FIG. 3 is an electrical schematic diagram illustrating a preferred embodiment of the speed shift indicating device of the present invention.

DETAILED DESCRIPTION OF THE PREFERRED EMBODIMENT

Figure 1:
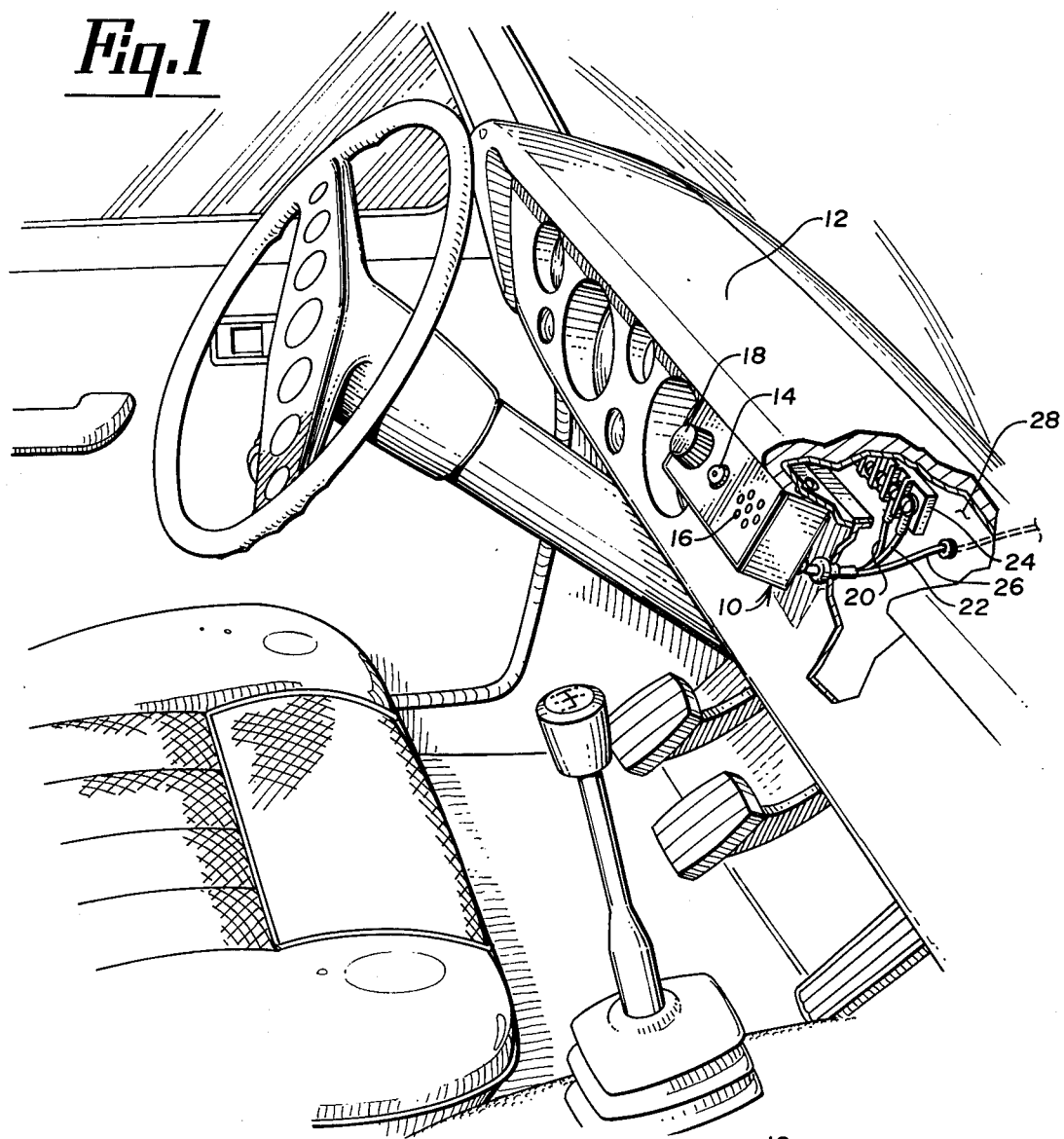
FIG. 1 is a pictorial view of the driver compartment of a vehicle having the speed shift indicating device of the present invention installed.
Figure 2:
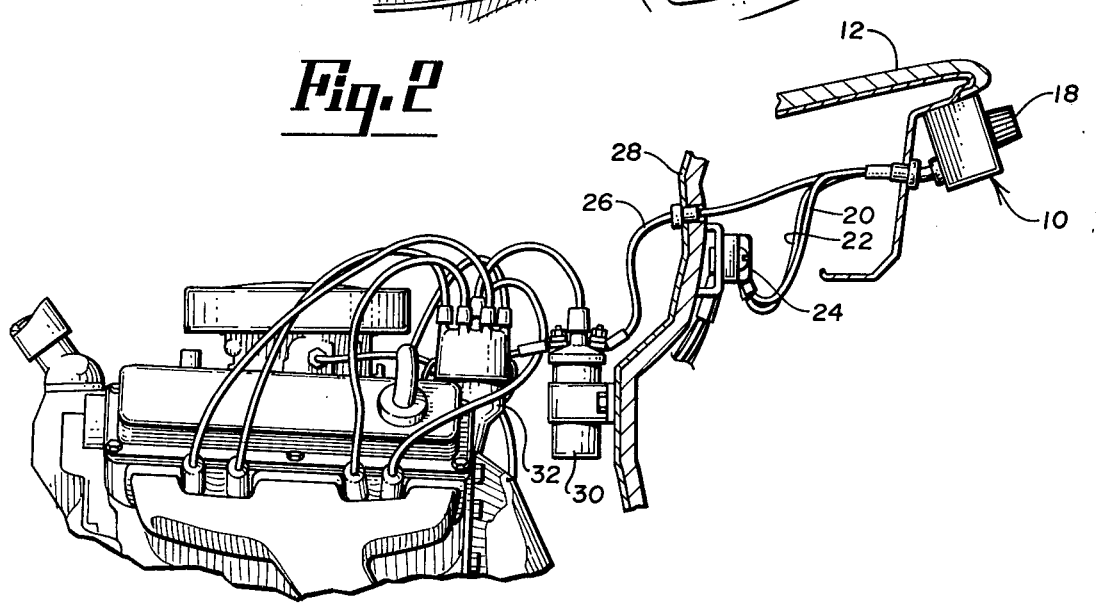
FIG. 2 shows a portion of the driver compartment and engine compartment of a vehicle, with the speed shift indicating device of the present invention mounted to the dashboard within the driver compartment and with a single wire extending from the driver compartment, through the firewall, and to the ignition system within the engine compartment.

FIGS. 1 and 2 show the speed shift indicating device of the present invention as it is installed in a typical vehicle. The speed shift indicating device includes a housing 10 which is attached to dashboard 12 of the automobile. As shown in FIG. 1, the speed shift indicating device includes an indicating light 14, a horn or buzzer 16, and a speed adjustment or selector knob 18. Indicator light 14 provides a visual indication and horn 16 provides an audible indication of when a predetermined engine speed has been attained. Adjusting knob 18 permits the driver to adjust or vary the predetermined engine speed at which indicator light 14 and horn 16 are actuated.

As shown in FIGS. 1 and 2, only three wires are required to connect the speed shift indicating device to the electrical system of the vehicle. First and second wires 20 and 22 are connected to the +12 volt and ground terminals of terminal block 24 within the driver compartment. The third wire 26 extends through firewall 28 and into the engine compartment. In the embodiment shown in FIG. 2, wire 26 is connected to one terminal of ignition coil 30.

The installation of the speed shift indicating device of the present invention is extremely simple. The electrical connections are extremely straightforward, and only a single wire 26 must extend through firewall 28.

FIG. 3 is an electrical schematic diagram illustrating the preferred embodiment of the speed shift indicating device of the present invention. In FIG. 3, a typical ignition system for an 8 cylinder automobile engine is illustrated in order to show how an input electrical signal having a repetition rate indicative of engine speed is derived from a typical automobile ignition system. Although the particular ignition system is of a conventional breaker point type and is for an 8 cylinder automobile engine, this particular ignition system is shown solely for the purposes of illustration. The speed shift indicating device of the present invention is applicable to different types of ignition systems including electronic ignition systems and with engines with various numbers of cylinders.

The ignition system illustrated in FIG. 3 includes a distributor 32 having a plurality of fixed contacts 34. Each of the fixed contacts 34 is connected to one of a series of igniters 36, which normally take the form of spark plugs. Cooperating with the fixed contacts 34 is rotating distributor arm 38, which is driven by the engine to successively make electrical contact with the various fixed contacts 34 and successively connect the output of distributor 32 to the various igniters 36 in the desired sequence.

Driven by the same shaft as distributor rotor arm 38 is cam 40, which cooperates with the "points" 42 formed by two switch blades 44 and 46. Switch blade 44 is grounded and stationary while switch blade 46 is movable. Cam 40 periodically moves switch blade 46 away from switch blade 44 to "open" the points 42. The usual capacitor 48 is connected across points 42. The number of fixed contacts 34 and the number of lobes on cam 40 depend, of course, on the number of cylinders in the engine and the number of igniters 36 employed.

Points 42 control the flow of current through primary winding 50 of ignition coil or transformer 30. Primary winding 50 is provided with two electrical terminals 52 and 54. Terminal 52 is connected through the usual key-operated ignition switch 56 to the ungrounded terminal of automobile battery 58. Terminal 54 of primary winding 50 is connected to movable switch blade 46 of points 42. High voltage secondary 60 of ignition transformer 30 has one terminal connected to terminal 54, and the other terminal connected through conductor 62 to distributor arm 38. Thus, as cam 40 rotates and points 42 are opened and closed, the flow of current through primary winding 50 is interrupted to produce a high voltage in secondary winding 60. The high voltage produced in secondary winding 60 is successively applied to the fixed distributor points 34 and hence to the respective igniters 36 as the distributor arm 38 rotates.

As shown in FIG. 3, wire 26 from the speed shift indicating device of the present invention is connected to terminal 54. The electrical signal present at terminal 54 has a repetition rate indicative of engine speed, since each time the points open or close there is an abrupt change in the voltage appearing at the terminal 54. This input electrical signal from the ignition system is supplied through wire 26 to input terminal 64 of the speed shift indicating device.

Power is supplied to the speed shift indicating device through terminals 66 and 68. Wire 20 connects terminal 66 with the +12 volt terminal on the terminal block 24 within the driver compartment, while wire 22 connects terminal 68 with the ground terminal of terminal block 24.

The speed shift indicating device circuit shown in FIG. 3 includes two main conductors 70 and 72. Conductor 70 is connected to terminal 66 while conductor 72 is connected to terminal 68.

The electrical input signal supplied through wire 26 to input terminal 64 is first received by a trigger pulse circuit formed by resistors R1 through R4, diodes D1 and D2, and transistor Q1. Resistors R1 and R2 form a voltage divider between terminal 64 and conductor 72. Diodes D1 and D2 form a diode bridge connected between conductors 70 and 72. The cathode of D1 is connected to conductor 70 and the anode of D1 is connected to both the junction of resistors R1 and R2, and to the cathode of diode D2. The anode of D2 is connected to conductor 72. Resistor R3 has one terminal connected to the junction of R1 and R2 and to the junction of the diode bridge, and has its opposite terminal connected to the base of NPN transistor Q1. The emitter of Q1 is connected to conductor 72, while the collector is connected through resistor R4 to conductor 70.

The trigger pulses are derived from the collector of transistor Q1 and are supplied to a solid state timer 74, which is preferably a solid state timer such as National Semiconductor NE555. Timer 74 has its Reset and Vcc terminals 74a and 74b connected to conductor 70 and its Ground terminal 74c connected to conductor 72. The Trigger input 74d of timer 74 is connected to the collector of transistor Q1.

Transistor Q2, resistor R5, capacitors C1 and C2, and potentiometer R6 form a first timing signal circuit which is also connected to timer 74 and to the collector of transistor Q1. Transistor Q2 is a PNP transistor, having its base connected to the collector of Q1, its emitter connected to the Threshold and Discharge inputs 74e and 74f of timer 74, and its collector connected through resistor R5 to conductor 72. Capacitor C1 is connected between the Discharge and Threshold inputs 74e and 74f and conductor 72, and capacitor C2 is connected between the Control Voltage input 74g of timer 74 and conductor 72. Potentiometer R6, which is controlled by speed adjustment knob 18, is connected between conductor 70 and the Threshold and Discharge inputs 74e and 74f.

The Output terminal 74h of timer 74 is connected to a second timing signal circuit formed by diode D3, resistor R7 and capacitor C3. Resistor R7 has one terminal connected to conductor 70, and the other terminal connected to both the anode of D3 and one terminal of capacitor C3. The other terminal of capacitor C3 is connected to conductor 72, while the cathode of diode D3 is connected to the output terminal 74h of timer 74.

The junction of R7-C3 and the anode of D3 is connected to an annunciator control circuit formed by diodes D4 and D5, NPN transistors Q3 and Q4, and resistors R8 and R9. Diodes D4 and D5 are connected in series between the junction of R7-C3 and the base of transistor Q3, with the anode of D4 connected to the junction of R7-C3, the cathode of D4 connected to the anode of D5, and the cathode of D5 connected to the base of Q3. Resistor R9 is also connected between the base of transistor Q3 and conductor 72. Resistor R8 is connected between conductor 70 and the collector of transistor Q3.

The emitter of transistor Q3 is connected to the base of transistor Q4. The emitter of Q4 is connected to conductor 72, while its collector is connected to one terminal of annunciator light 14 and one terminal of annunciator buzzer 16. The opposite terminals of light 14 and buzzer 16 are connected to conductor 70.

The operation of the speed shift indicating device of FIG. 3 is as follows:

The input electrical signal supplied by wire 26 from terminal 54 is received at input terminal 64. The voltage divider R1-R2 reduces the signal level to the input of the diode bridge formed by D1 and D2. The diode bridge limits the voltage from about +12 volts on the positive side to about −0.7 volts on the negative side. The input signal, therefore, is conditioned to a level which is acceptable for the remaining circuitry regardless of the signal level supplied at input terminal 64. As a result, the circuit is equally applicable to both a breaker type ignition system, as illustrated in FIG. 3, and an electronic ignition system, despite the significant differences of the voltage levels of the signals obtained from those two types of systems, due to the fact that with an electronic igniter system the input signal must be obtained from the output of the high voltage secondary.

Each time a pulse is received, as a result of the opening of points 42, transistor Q1 is turned on. The voltage at Trigger input 74d of timer 74 goes low when Q1 turns on. Normally Trigger input 74d is high because Q1 is turned off and R4 connects Trigger input 74d to conductor 70.

The turning on of Q1 also turns on transistor Q2, thereby discharging capacitor C1. This reduces the potential of the Threshold and Discharge terminals 74e and 74f of timer 74 to approximately ground potential. Transistor Q1 and Q2 turn off as soon as the trigger pulse is ended, and capacitor C1 begins to recharge through the current path provided by potentiometer R6. The Output 74h of timer 74 remains high for a first time period which is determined by the time required for C1 to charge to a first threshold voltage. At that point, the Output 74h of timer 74 again goes low. The first time period is controlled by the resistance value of potentiometer R6, which can be adjusted by adjustment knob 18. By adjusting the resistance value of R6, the first time period, and therefore the period between trigger pulses required to actuate annunciators 14 and 16, can be selected by the driver.

When the Output 74h of timer 74 goes high, capacitor C3 is permitted to charge through the current path provided by resistor R7. When the voltage across capacitor C3 reaches a second threshold level which exceeds the forward bias voltage drop of diodes D4 and D5 and the base-emitter junctions of transistors Q3 and Q4 (i.e. a total of approximately 2.8 volts) transistors Q3 and Q4 turn on, thereby actuating light 14 and buzzer 16. A second timer period is required for capacitor C3 to reach this second threshold level. This second time period is longer than the first time period.

When the engine speed is below the desired shift speed, the period between trigger pulses is longer than the first time period. The Output 74h of timer 74, therefore, goes low at the end of the first time period, since another trigger pulse has not been received during the first time period. When the output goes low, capacitor C3 is discharged through D3 and the Output 74h to Ground 74c of timer 74. Transistors Q3 and Q4 therefore, are not permitted to turn on, and light 14 and buzzer 16 remain off.

When the engine speed reaches a value at which the duration between trigger pulses becomes less than the first time period, transistors Q1 and Q2 will again be turned on before the output of timer 74 has gone low, and the charge on capacitor C1 is discharged before reaching the first threshold value. As soon as Q1 and Q2 turn off again, C1 again begins to charge toward the first threshold value.

Once timer 74 has been initially triggered, the Output 74h of timer 74 will remain high as long as the voltage at the Threshold and Discharge inputs 74e and 74f remains below the first threshold value. If the trigger pulses continue to occur with a duration between pulses which is less than the first time period, the output of timer 74 remains high.

As stated previously, the second time period required for capacitor C3 to charge to the second threshold level which turns on transistor Q4 is greater than the first time period. If the trigger pulses are occurring at a rate so that the output of timer 74 remains high for longer than the first time period, capacitor C3 is permitted to charge to the second threshold level, and transistor Q4 turns on. At this time, both annunciator light 14 and buzzer 16 are actuated. They remain actuated as long as transistor Q4 remains on, which is as long as capacitor C3 has a voltage across it which is greater than the second threshold level. This, in turn, occurs as long as the Output 74h of timer 74 remains high.

In normal operation, the engine speed is initially low and begins to increase as acceleration takes place. As long as the trigger pulses have a duration between pulses which is longer than the first time period, Output 74h of timer 74 goes high, remains high only for the first time period and then goes low until the next trigger pulse is received. Capacitor C3 therefore, is charged and then discharged without reaching the second threshold level.

As engine speed increases, the duration between trigger pulses decreases, until finally the duration between pulses is less than the first time period. When this occurs, capacitor C1 is discharged before reaching the first threshold level, and the output of timer 74 remains on for at least a second time period longer than the first time period. As a result, capacitor C3 is permitted to charge to the second threshold level, thereby turning on transistor Q4 and actuating light 14 and buzzer 16. As a result of the visible and audible signals from light 14 and buzzer 16, the driver shifts the manual transmission to a different gear ratio. The engine speed decreases to a level at which the duration between trigger pulses is once again greater than the first time period. If the vehicle is continuing to accelerate, the time period between trigger pulses will again reduce with increasing engine speed, until once again the output of timer 74 remains high for longer than the first time period, thereby once again turning on transistor Q4 and actuating light 14 and buzzer 16.

Table I lists component values used in one successful embodiment of the speed shift indicating device shown in FIG. 3.

TABLE I

| R1 | 10K | R8 | 1K | D3 | 1N4001 |
|---|---|---|---|---|---|
| R2 | 470Ω | R9 | 10K | D4 | 1N4001 |
| R3 | 10K | C1 | 0.2 μf | D5 | 1N4001 |
| R4 | 10K | C2 | 0.01 μf | Q1 | 2N2925 |
| R5 | 100Ω | C3 | 20 μf | Q2 | 2N3703 |
| R6 | 200K | D1 | 1N4001 | Q3 | 2N2925 |
| R7 | 39K | D2 | 1N4001 | Q4 | T1P31C |
| Timer 74 | | NE555 National Semiconductor | | | |

The speed shift indicating device of the present invention has several significant advantages. First, it is extremely simple to install, since only a single wire 26 extends from the driver compartment to the engine compartment. In addition, only two other wires 20 and 22 require connection, and these may be made to the terminal block within the driver compartment.

Second, the speed shift indicating device can be used with a wide variety of ignition systems, including both breaker type and electronic type ignitions. The difference in voltage levels produced by these types of ignition systems are equally useful with the speed shift indicating device of the present invention.

Third, the speed shift indicating device is not pulse width sensitive. As the points 42 of a breaker type ignition system begin to wear, the pulse width (the time that the points stay open) changes. In some prior art speed shift indicating devices, this change in pulse width causes vibration in frequency response and results in inaccuracy of the device.

Fourth, the speed shift indicating device of the present invention is extremely accurate. In effect, any increase in engine speed (even within a single opening and closing points 42) which reduces the duration between trigger pulses to less than the first time period will be sensed by the speed shift indicating device.

Fifth, the speed shift indicating device of the present invention uses a small number of components, is low cost, and can be packaged in an extremely small housing.

Although the present invention has been described with reference to preferred embodiments, workers skilled in the art will recognize that changes may be made in form and detail without departing from the spirit and scope of the invention.

What is claimed is:

1. A speed shift indicating device for a vehicle driven by an internal combustion engine having an ignition system, the vehicle having a manually controlled transmission, the speed shift indicating device comprising:
    trigger means for receiving an input electrical signal having a repetition rate indicative of engine RPM and providing trigger pulses in response to the input electrical signal;
    timer means having an output which has first and second states, the timer means output switching to the first state in response to a trigger pulse and remaining in the first state only for a first time period unless another trigger pulse is received before the end of the first time period;
    adjusting means for adjusting the first time period;
    annunciator means to indicate, when energized, the need to shift the transmission; and
    annunciator control means for energizing the annunciator means only if the timer means output remains in the first state for at least a second time period greater than the first time period.

2. The speed shift indicating device of claim 1 wherein the trigger means comprises a diode network for limiting the amplitude of the input electrical signal.

3. The speed shift indicating device of claim 2 wherein the trigger means further comprises first transistor means connected to the diode network for switching in response to the amplitude-limited input electrical signal.

4. The speed shift indicating device of claim 1 wherein the timer means comprises:
    a solid state timer having a trigger terminal for receiving the trigger pulses, a threshold terminal for receiving a first timing signal which varies with time, and an output terminal, the solid state timer having an output at the output terminal which switches to the first state in response to the trigger pulse and remains in the first state only until the timing signal attains a first threshold level, unless another trigger pulse is received before the timing signal attains the second level;
    first timing signal means connected to the threshold terminal for providing the first timing signal; and
    reset means for resetting the first timing signal to a reset level in response to the trigger pulses.

5. The speed shift indicating device of claim 4 wherein the first timing signal means comprises a first RC network.

6. The speed shift indicating device of claim 5 wherein the adjusting means comprises an adjustable resistor in the first RC network.

7. The speed shift indicating device of claim 6 wherein the reset means comprises second transistor means having its base connected to receive the trigger pulses, and having its collector and emitter connected to provide a discharge path for a capacitor of the RC network when a trigger pulse is received.

8. The speed shift indicating device of claim 1 wherein the annunciator control means comprises:
    switching means connected to the annunciator means for energizing the annunciator means when a second timing signal attains a second threshold level; and
    second timing signal means connected to the timer means and the switching means for providing the second timing signal which varies with time when the timer means has the first output state, which requires the second time period to attain the second threshold level, and which is reset each time the timer means output switches to the second state.

9. The speed shift indicating device of claim 8 wherein the second timing signal means comprises a second RC network.

10. For use in a vehicle having an engine compartment and a driver compartment separated by a firewall, the vehicle being driven by an internal combustion engine having an ignition system located in the engine compartment, the vehicle having a multiple-gear ratio transmission connected between the engine and the driven wheels of the vehicle with manually controlled shift means located in the driver compartment for shifting the gear ratio of the transmission, the invention comprising:
    a single wire extending from the driver compartment through the firewall into the engine compartment and connected to the ignition system to derive an input electrical signal having a repetition rate indicative of engine RPM; and
    a speed shift indicating device located in the driver compartment, the speed shift indicating device having an electrical circuit connected to the single wire for receiving the input electrical signal and actuating annunciator means when the repetition rate of the input electrical signal exceeds a driver-selected repetition rate.

11. The invention of claim 10 wherein the speed shift indicating device comprises:
    trigger means for receiving the input electrical signal and providing trigger pulses in response to the input electrical signal;
    timer means having an output which has first and second states, the timer means output switching to the first state in response to a trigger pulse and remaining in the first state only for a first time period unless another trigger pulse is received before the end of the first time period;
    adjusting means for adjusting the first time period;
    annunciator means for indicating that a desired shift point has been attained; and
    annunciator control means for energizing the annunciator means only if the timer means output remains in the first state for at least a second time period greater than the first time period.

* * * * *